United States Patent Office 3,684,470
Patented Aug. 15, 1972

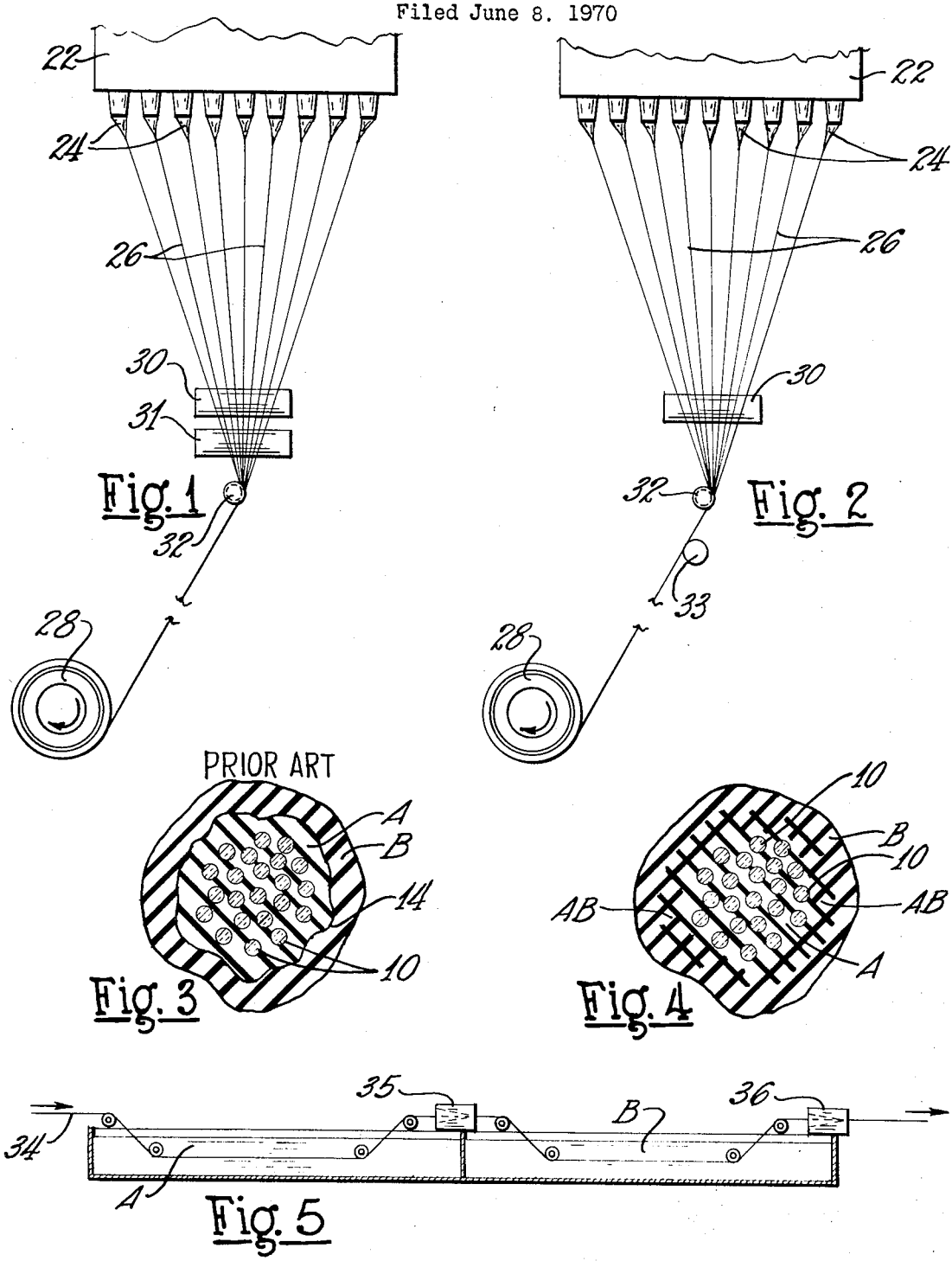

3,684,470
METHOD FOR TREATING GLASS FIBERS
Alfred Marzocchi, 35 Thomas Leighton Blvd.,
Cumberland, R.I. 02864
Filed June 8, 1970, Ser. No. 44,299
Int. Cl. C03c 25/02
U.S. Cl. 65—3       12 Claims

ABSTRACT OF THE DISCLOSURE

This invention discloses a method of treating glass fibers which are incorporated into and thereby reinforce the continuous phase of elastomeric products such as rubber tires and rubber belts. The inventive method can be used to treat glass fibers at the time they are formed. The method comprises applying to the fibers a first coating of an elastomeric, elastomeric-compatible or elastomeric-based composition and, while this first coating is still wet or at least not dry, applying to the fibers a second coating of an elastomeric-based composition.

BACKGROUND OF THE INVENTION

This invention relates to the treatment of glass fibers which are combined with elastomeric materials to produce glass fiber reinforced elastomeric products, such as rubber belts, rubber tires and the like. These elastomeric materials are generally natural or synthetic rubbers whose strength, toughness and dimensional stability can be greatly enhanced by the presence of glass fibers.

In utilizing glass fibers to reinforce elastomeric systems, they are gathered together into glass fiber bundles, such as strands or yarns. These bundles are then processed to the form desired for use in reinforcement such as by twisting, plying or other manipulation to form cords, woven fabrics or belts which may then be incorporated into the continuous phase elastomer system, e.g. rubber tires, belts, hoses or the like.

Prior to incorporation of the glass fibers into the elastomeric system to be reinforced, it is necessary to treat or impregnate the fibers or bundles with one or more compositions which will: (1) hold the fibers separate from one another and, (2) will enhance adhesion between the processed bundles (cords, fabrics and the like) and the continuous phase elastomer. Fiber separation is necessary to avoid destruction of the glass fibers by mutual abrasion. Adhesion between the fiber bundles and the elastomeric system is necessary to impart the strength of the fibers to the final elastomeric product.

It is conventional to apply in excess of 12% by weight of the treated glass fibers of elastomeric-compatible or elastomeric-based compositions to the fibers in order to achieve fiber separation and adhesion. Generally a first composition is applied to the fibers at the time they are drawn from a molten glass supply, i.e. at forming. This first composition or coating usually contains an anchoring agent such as gamma-aminoproplytriethoxy silane plus a film forming composition whereby the coating serves to protect the glass fibers from mutual abrasion while also offering fuller coordination of the glass fibers with not only the subsequently applied impregnating composition but also the continuous elastomeric phase. The individually coated glass fibers are then gathered into bundles and these bundles are twisted, plied or woven into cords or fabrics; the latter then being impregnated in a separate operation (distinct from the glass fiber forming stage) with an elastomeric-based impregnant which will react with or adhere to the continuous phase elastomer during final product formation, e.g. vulcanization. The amount of impregnant applied during this step is determined by the amount of loading required for good adhesion; generally 12–25% solids (by weight of the treated glass fibers) is required for satisfactory adhesion.

When the art has attempted to fully load or impregnate the fibers at forming, the result has been seizure of the fibers during subsequent processing (bundling, twisting, plying, weaving) due to the bulkiness of the fibers which as noted above may have a 12–25% loading. To avoid this problem, the art changed to a three step process which necessarily moved away from full loading at forming. This three step process involves: (1) applying a portion of the impregnant (with anchoring agent) at forming; (2) gathering the fibers into bundles, drying or partially curing these bundles, and then processing the bundles to desired form; and (3) applying a second impregnant coating to bring the processed bundle loading up to the amount necessary for good adhesion.

This latter tecnique has drawbacks in addition to moving away from instead of toward the optimum full loading at forming. For example, an interface or distinct layering effect is realized between the first and second impregnant coatings. This often results in a relatively weak link between the two coatings and presents the possibility of separation of these layers when the bundle or processed bundle (cord, yarn, fabric and the like) is placed under stress in the final product. Should this occur in a tire body, for example, the reinforcing fibers would be loose or disconnected from the continuous elastomer phase of the tire and fail to contribute their high strength properties to the continuous phase.

SUMMARY OF THE INVENTION

This invention discloses a method of treating glass fibers for incorporation into and reinforcement of a continuous phase elastomer such as a tire. The inventive method can be performed at the time of forming of the glass fibers, improves strength properties and opens up new areas of impregnating or coating compositions which can be used to achieve fiber separation. Essentially, this method comprises coating the glass fibers with an elastomeric, elastomeric-compatible or elastomeric-based composition and, while this coating is still wet, fluid, flowable or at least not dry, applying an elastomeric-based composition to the coated fibers or bundles. This second application may be performed prior to or following gathering of the fibers into bundles. This technique results in the production of glass fiber bundles having a continuum of elastomeric-compatible and elastomeric-based compositions rather than two distinct layers of these compositions with an interface between them. This process can also be completely performed at the time of forming due to the greater strength properties attainable at lower full loading percentages.

The elimination of interface formation between the coating or impregnant layers has a number of significant advantages which include (1) greater bundle strength; a mechanical interlock or bond is formed in the intermediate portions of the fiber bundle between the two compositions; (2) if the two compositions are the same, or if different but cross-linkage, a chemical bond is also realized between the two substances in the area of their overlap; this further increases strength; (3) anchoring agents normally required to bond the glass fiber surface to the coating or impregnant are not required if a high modulus, elastomeric-compatible first coating is chosen; (4) many different impregnants and combinations thereof may now be employed which previously were unusable due to their incompatibility with anchoring agents; (5) the amount of total impregnant applied to the fibers to attain good adhesion is not so rigidly set; i.e. less than 12% (by weight

DESCRIPTION OF THE DRAWINGS

For purposes of illustration, but not of limitation, the invention and its environment are shown in the accompanying drawings in which:

FIG. 1 is a schematic diagram showing the manufacture of continuous glass fibers and one technique for treating them in accordance with this invention;

FIG. 2 is a schematic diagram showing the manufacture of continuous glass fibers and another technique for treating them in accordance with this invention;

FIG. 3 is a cross-sectional view of glass fibers processed in accordance with prior art techniques;

FIG. 4 is a cross-sectional view of glass fibers processed in accordance with the teachings of this invention; and FIG. 5 is a schematic diagram showing another technique for treating glass fibers in accordance with this invention.

DESCRIPTION OF THE INVENTION

The glass fibers which may be used in practicing this invention may be employed in a variety of forms. Accordingly, the term "glass fibers" as used herein, shall refer to (1) continuous fibers formed by the rapid attenuation of hundreds of streams of molten glass and to strands formed when such continuous glass fibers are gathered together in forming; and to yarns and cords formed by plying and/or twisting a number of strands together, and to woven and non-woven fabrics which are formed of such fiber strands, yarns, or cords, and (2) discontinuous fibers formed by high pressure steam or air directed angularly downwardly onto multiple streams of molten glass issuing from the bottom side of a glass melting bushing and to yarns that are formed when such discontinuous fibers are allowed to rain down gravitationally onto a foraminous surface where the fibers are gathered together to form a sliver which is drafted into a yarn; and to woven and non-woven fabrics formed of such yarns of discontinuous fibers, and (3) combinations of such continuous and discontinuous fibers in strands, yarns, cords and fabrics formed thereof.

As used herein, the term "elastomer" or "elastomeric" are meant to include natural rubber or synthetic rubber, such as formed by polymerization of monomeric materials such as chloroprene, various of the conjugated butadienes, such as 1,3-butadiene, methyl-2-butadiene, 1,3-piperylene, and 2,3-dimethyl butadiene; and mixtures of such conjugated butadienes with other copolymerizable monomers, such as up to 50% or more by weight of a monomer which contains a monoolefinic group, such as aryl olefins as represented by styrene and vinyl naphthalene; and alpha-methylene carboxylic acids and their corresponding esters, nitriles and amides, such as acrylic acid, methyl acrylates, methyl methacrylate, acrylonitrile, methyl acrylamide and the like; isobutylene, methyl-vinyl-ether and methyl-vinyl-ketone. The elastomeric component may also comprise an EPDM type rubber such as formed by the interpolymerization of ethylene, a monoolefin containing from 3 to 18 carbon atoms, such as propylene, butylene, etc., and a polyolefin, such as cyclopentadiene, 1,2-hexadiene, and preferably a 5-alkylene-2-norbornene or a 5-alkylidene-2-norbornene, such as 5-ethylidene-2-norbornene, 5 - propylidene-2-norbornene, 5-butenyl-2-norbornene and the like.

The invention is addressed to the fuller utilization of the desirable characteristics of glass fibers, such as their high strength, flexibility, thermal stability, chemical stability, inertness, electrical resistance and heat conductive characteristics when used in combination with elastomeric materials as a reinforcement or as a stabilizing agent in belt manufacture, as reinforcing cords in fabrics to increase strength, life, wearability, and surface characteristics in rubber tires, and as a reinforcement and the like in other elastomeric coated fabrics and molded elastomeric products.

In preparing and treating glass fibers for incorporation into elastomeric products, it is common practice to initially coat the fibers with a composition which will hold the fibers separate from each other when they are gathered into a bundle. Fiber separation is required to avoid destruction of the fibers by mutual abrasion. A second coating is then applied to the previously coated and bundled fibers whose purpose is to impregnate the fiber bundle and be reactive with the continuous phase elastomer thereby adhering the fibers to the continuous phase. The two compositions applied to the fibers may be the same or different compounds.

When applying these techniques, the prior art has suggested either (1) applying the first coating to the fibers at forming, drying and/or curing or partially curing it (before or after the fibers are gathered into bundles), processing the bundles into yarns, cords or fabrics and then impregnating the yarns, cords or fabrics with a substance which will promote adhesion with the continuous phase elastomer; or (2) performing the steps in (1) above after the fibers have been formed. These approaches result in a fiber bundle (or number of fiber bundles in the case of yarns, cords and fabrics) which have a configuration like that depicted in FIG. 3 of the drawings. The glass fiber bundle in FIG. 3 is shown having a plurality of glass fibers 10 embedded in a first coating A, which serves to separate the fibers and cushion them during subsequent processing of the fiber bundle. After processing of the bundles into yarns, cords or fabrics, they are impregnated with a second composition, B. As indicated in FIG. 3 an interface 14 forms between the A and B treatments since the A treatment was dried (in order to process the bundle) prior to the application of B. A similar interface results when the B treatment is applied, prior to processing, to a non-fluid, e.g., dried, cured or partially cured, A coating.

Employing the process of treating glass fibers taught by this invention, however, a fiber bundle configuration such as depicted in FIG. 4 is attained. As shown in FIG. 4, there lies between the A and B treatments an intermediate area depicted as AB. This AB area contains a mixture of the A and B coatings or treatments; that is, an area of gradual transition from A to B (a continuum of A and B as opposed to an interface) as one moves outwardly from the interior of the bundle. The strength of such an A—AB—B bundle configuration as shown in FIG. 4 is greatly increased over that of the A—B configuration in FIG. 3 because of the intertie or interlock between the two treatments in the AB area. The intertie or interlock may be of a purely mechanical nature or of a mechanical and chemical nature in instances where A and B are the same or, if different, chemically reactive or cross-linkable.

To attain the desirable A—AB—B type fiber bundle configuration, this invention teaches the application of a first or an A coating to a multiplicity of glass fibers either at or after forming. Prior to drying or setting up of the A coating or treatment, that is, while the A coating is still fluid, a second or B coating is applied (either at or after forming). Since the A coating is fluid or flowable when the B coating is applied the A and B coatings become intermixed at their points of contact (the AB area); this results in the general type of bundle configuration depicted in FIG. 4. It is believed that the individual glass fibers in the bundle are allowed some movement due to the still fluid or semi-fluid nature of the A coating; this movement allows the B coating to more efficiently penetrate, impregnate or intermix with the A coating and form the desired configuration.

Referring now to the schematic diagram of FIG. 1, glass fibers or filaments are formed by melting glass in a glass melter or furnace (not shown) having a bushing 22 on the bottom side thereof. The bushing is formed with a plurality of openings extending therethrough and the molten glass flows gravitationally through the hundreds of small openings in the bushing to form streams 24 which are rapidly attenuated into fine glass filaments 26 by winding the filaments about a rapidly rotating drum 28. The filaments 26 may have the A coating applied to them by means of a roller 30 whose peripheral surface is constantly wet with the A treatment. The filaments of glass are each wet with the A treatment as they pass over this roller 30. The B treatment may be applied to the filaments 26 immediately after the application of the A treatment, as for example by roller 31 located directly below roller 30. Alternately, as shown in FIG. 2, the B treatment may be applied after the fibers have been coated with A (at 30) and gathered together into a bundle by passage through a gathering shoe 32. In this case, the B treatment could be applied by means of a wiping pad 33 which would be wet with the B treatment.

It is also possible to employ the technique of this invention after forming by unwinding glass fibers, in the form of strands or yarns, from a spool or creel and advancing these fibers through a dual bath system containing separate baths of the A and B treatments. This technique is shown schematically in FIG. 5 where treatments A and B are retained in separate baths and a fiber bundle 34 is passed through the A coating bath, through wiping die 35 and, without drying, dricetly into the B coating bath and through wiping die 36. The bundle may then be dried, cured or semi-cured or otherwise processed in any desired manner. It is apparent that the essential feature of this invention is accomplished, that is, application of the B coating to the A coating prior to drying of the A coating.

When using a technique such as that shown in FIG. 5 the first wiping die 35 may be provided with an orifice slightly smaller than the diameter of the fiber bundle 34 in order to slightly compress or squeeze the bundle as it passes through the die. This compression will cause the bundle, upon leaving the die 35 and entering the B coating bath, to fan or spread out slightly to facilitate penetration of the B coating.

When employing the concepts of this invention with yarns formed of discontinuous fibers, it becomes necessary to first process the fibers into yarns and then use the dual coating technique on these yarns. The system shown in FIG. 5 would be exemplary of a method of practicing the invention with discontinuous fibers drafted into yarns which are fed through a double bath arrangement.

Using the techniques described in this invention a variety of compositions can now be used for the treatment of glass fibers used to reinforce elastomeric materials which previously were unavailable. For example, the systems previously used employed an anchoring agent in the coating, treatment or impregnant first applied to the fibers. This was required to insure a secure bond between the glass fiber surface and elastomeric impregnant. Consequently, any coating composition which had desirable properties but was incompatible or non-reactive with standard anchoring agents could not be used. In this invention, however, the strong mechanical interlock between the A and B coatings in the AB area allows the elimination of these anchoring agents while maintaining the strengths acquired when anchoring agents are included in the impregnating composition. Further, if the A and B coatings are the same or if different but cross-linkable, the mechanical interlock is further enhanced by chemical bonding in the AB area. Many potential A compositions of high modulus and other desirable physical properties in combination with reinforcing glass fibers have not been used because of their incompatibility with anchoring agents. For example, many polyester, epoxy and polyamide emulsions as well as polyamine type compounds (for example, polyethylene amine) have high strength potential and would be good fiber separators when combined with glass fibers but are not compatible with the anchoring agents most often employed with glass fibers. Such anchoring agents would include gamma-aminopropyltriethoxy silane or other organo silicon compounds in which the organic group attached to the silicon atom contains an amino group; or of other organo silicon compounds in the form of a silane, silanol or polysiloxane in which the organic group attached to the silicon atom contains an epoxy group; or instead of the organo silicon compounds, a Werner complex compound in which the carboxylato group coordinated with the trivalent nuclear chromium atom contains an amino group or an epoxy group. Some of the rigid, high modulus resins which can now be used as the A coating include phenolic, melamine-formaldehyde and urea-formaldehyde resins, polyesters, polyamides polyamines, the reaction products of amines and epoxides (an excess of amine producing amine type resins and an excess of epoxy producing epoxy type resins) as well as epoxy and other thermosetting resins. Upon cure of these resins, a tough, rigid network is formed around the fibers which prevents them from contacting or abrading one another. In such a system, therefore, anchoring agents would not be required to chemically lock the fibers to the A coating since they are rigidly held in place by this resinous material. Further, as long as the A coating is at least compatible with the B coaing it will be mechanically locked (in the AB area) with the subsequently applied B coating.

Essentially then, the A and B coatings as described above can be chosen from any number of chemical compounds exhibiting specific properties desired in any particular application so long as they are compatible with each other and thereby capable of mechanically interlocking or intertying. Any chemicl bonding or intertying between the A and B compounds is of added benefit. It should also be noted that the A coating need not necessarily be compatible with the continuous phase elastomer in that in the final product it will be completely covered by the B coating. The A coating should be sufficiently flowable to coat the glass fibers yet when cured it should be able to lock the fibers in place and prevent them from abrading one another. The B coating should be compatible with the A coating at least to the extent that it can intermix with the A coating in the intermediate bundle area. The B coating, of course, must be compatible with the continuous phase elastomer; in fact, the B coating is most preferably elastomer-based to enable it to be bonded to the continuous phase elastomer during curing (for example, during vulcanization of a tire).

It is contemplated that the following compositions or combinations thereof can be used as the A coatings: natural and synthetic latices; urethanes (polyester and polyester based); polyamides, (for example, nylon; these could be applied as a suspension, or the constituents thereof can be reacted in situ on the fibers); epoxides; polyesters; urea-formaldehyde resins; melamine formaldehyde resins; phenol-formaldehyde resins; epoxides and amines such as diamines and polyethylene amines; polyamines; the reaction products of ethylene-propylene elastomeric polymers; resorcinol formaldehyde latex systems; vinyl pyridine; and rubber cements. Potential B coatings can include the following, alone or in combination: resorcinol formaldehyde latex systems; vinyl pyridine; elastomeric cements; and epoxy adhesives. These particular coating compositions are set forth purely by way of example, the primary requirements being that (1) the A and B coatings are compatible with each other to the extent that they will at least mechanically interlock or intertie in the intermediate portions of the fiber bundle and (2) the B coating is capable of reaction with and bonding to the continuous phase elastomer.

A further embodiment of this invention includes the concept of applying the A coating to the fibers as an acid system, i.e. with a pH of less than 7 and preferably 3 to 5, while the B coating is applied to the A coating as a basic system having a pH of more than 7, preferably 8 to 10. Upon coming in contact with the A coating, the B coating, due to its basic condition, causes a gelling of the A and B coatings which sets them in place. Using this same general concept the A coating could be applied as a basic system and the B coating applied to it as an acidic system. One method of employing this approach would be to use as the A coating a nitrogen containing acid solubilized system such as an amine-epoxy reaction product or polyethylene amine or an aminized polyester. The B coating could then be a base solubilized system such as ammonium salts of polyester resins having excess carboxyl groups, malonic acid or quaternized polyethylene amine. Along these same general lines the A coating might be a polyamine and an aminized epoxy or polyester reaction product. This latter type of A coating would act as an emulsifier for normally non-soluble resins such as polyesters, urethanes and the like. The resulting acidic emulsions would precipitate and thoroughly engulf the glass fibers upon contact with one of the above-noted basic B coatings.

Turning now to specific compositions which can be employed as the A and B treatments, the following Examples 1–5 set forth compositions which may be employed as the first or A coating:

Compositions described in U.S. patent application Ser. No. 398,305, filed Sept. 22, 1964:

EXAMPLE 1

60% by weight natural rubber latex—resorcinol formaldehyde resin dispersed in aqueous medium to 38% solids (Lotol 5540—U.S. Rubber Company) 40% by weight water.

EXAMPLE 2

15% by weight natural rubber latex—resorcinol formaldehyde resin dispersed in aqueous medium to 38% solids. 82% by weight water.

As disclosed in Ser. No. 398,305, the Example 2 composition also includes 3% of a silane, namely gamma-aminopropyltriethoxysilane, which serves as an anchoring agent. As noted above, practice of the inventive method does not require anchoring agents when relatively high modulus resins are used as the elastomeric based or compatible A coating. However in this case where a natural rubber latex is being used, the use of an anchoring agent may be beneficial. Also, the latex dispersion and water mixture are made alkaline with quaternary ammonium hydroxide before addition of the silane.

Impregnating compositions as described in application Ser. No. 400,517, filed Sept. 30, 1964, and now abandoned may also be employed as the A coating:

EXAMPLE 3

2.0 parts by weight resorcinol formaldehyde resin
1.4 parts by weight formaldehyde
5.0 parts by weight concentrated ammonium hydroxide
25.0 parts by weight (15:70:15) vinyl pyridine-butadiene-styrene terpolymer—41% solids (Gentac FS—General Tire & Rubber Co.)
50.0 parts by weight neoprene rubber latex (50% solids)
7.4 parts by weight butadiene-latex (60% solids)
0.2 part by weight sodium hydroxide
58.0 parts by weight water

EXAMPLE 4

2.0 parts by weight resorcinol formaldehyde resin
1.0 part by weight formaldehyde (37% solution)
2.7 parts by weight concentrated ammonium hydroxide
25.0 parts by weight vinyl pyridine terpolymer latex (42% solids)
41.0 parts by weight neoprene rubber latex (50% solids)
5.0 parts by weight butadiene latex (60% solids)
.05 part by weight sodium hydroxide
1.0 part by weight gamma-aminopropyltriethoxysilane
1100 parts by weight water

EXAMPLE 5

This composition is disclosed in application Ser. No. 494,654, filed Oct. 11, 1965, and now abandoned:

220 parts by weight water
1 part by weight sodium hydroxide
22 parts by weight resorcinol formaldehyde resin (70% solids)
15 parts by weight Formalin
30 parts by weight ammonium hydroxide
250 parts by weight (15:70:15) vinyl pyridine-butadiene-styrene terpolymer latex (41% solids)
415 parts by weight neoprene rubber latex (50% solids)
51 parts by weight butadiene rubber latex (60% solids)
115 parts by weight carbon black Aqueous solutions of polyamide resins could also be used as A coatings. A commerically available polyamide resin such as "Nalco 600" (National Aluminum Company) which is water soluble at a pH of about 5 could conveniently be used as an acidic A coating in an acidic A—basic B system as suggested above.

Polyester and epoxy resins having a viscosity of about 2000 centipoise at room temperature can be used as A coatings. An acceptable polyester resin would be "Epon 728" available from Shell Chemical Company; a commercially available epoxy resin called "Paraplex P44" is produced by Dow Chemical Company. Acceptable polyester resins could also be obtained from the reaction of phthalic anhydride and butylene glycol in the presence of catalysts such as cobalt naphthanate and benzoil peroxide. These same catalysts could be used to promote the reaction of maleic anhydride and ethylene glycol to produce acceptable polyesters.

Elastomer-based compositions which can be employed as B treatments would include those listed in Examples 1 through 5 above.

Due to the increased strength afforded by the mechanical bonding, and in some cases chemical bonding, between the A and B coatings applied in accordance with this invention it is possible to maintain low full loading weights of the fiber bundle treatments while maintaining or exceeding presently available strengths at higher loading levels. In this connection about 1 to 8% and preferably 3 to 7% by weight of the treated glass fibers of the A coating followed by 3 to 12% and preferably 5 to 10% of the B coating will provide acceptable strength values. When high modulus, high strength resins such as epoxies or polyesters are employed as the fiber separator or A coating, full loading may be accomplished with the A and B coatings accounting for less than 10% by weight of the treated glass fiber bundle. In addition this entire loading can be applied at forming without hampering subsequent processing of the bundle. That is, it is now possible to fully load the fiber bundle, then dry or partially cure the bundle and then process it to the form desired for reinforcement (e.g. woven fabric) rather than apply a first coating, dry or partially cure it, process the fiber bundle into the desired form and then impregnate the processed bundle.

Since this invention now makes possible the use of relatively high modulus resins such as epoxies or polyesters as the fiber separation treatment it also makes possible the manufacture of new products. For example, a resin could be used as the A coating which if cured or partially cured prior to processing would form a fiber bundle too stiff to process. Using the technique of this invention the same resin can be combined with an elastomeric-based B coating, dried, processed, incorporated into a continuous phase elastomer (e.g. tire body) and then cured along with the final product (e.g. at vulcanization). This could be used as a technique for incorporating rigid reinforcing members in a tire body; depending on the stiffness of the resin and amount used a non-defatable tire could be constructed.

Having now described this invention in detail, it should be understood that the inventive method does not reside in the ultimate processing, molding or vulcanization of the treated glass fibers and the continuous elastomeric phase but that such fabrication steps can be carried out with the treated glass fiber bundles in accordance with conventional practice. It should also be understood that changes may be made in the details of formulation and application without departing from the spirit of the invention as defined in the following claims.

I claim:

1. A method of preparing a multiplicity of glass fibers for incorporation into and reinforcement of continuous phase elastomers including the steps of:
   (a) coating said glass fibers with an elastomeric-compatible composition which upon subsequent drying or curing will hold said fibers apart from one another and thereby prevent said fibers from abrading one another;
   (b) impregnating said coated glass fibers with an elastomeric-based composition which is different from said elastomeric-compatible composition in step (a) and which is capable of reacting with or adhering to said continuous phase elastomer; and
   (c) gathering said fibers into glass fiber bundles either after step (a) and before step (b) or after steps (a) and (b);
   wherein the improvement comprises completing impregnating step (b) while said elastomeric-compatible composition applied to said fibers in step (a) is sufficiently fluid to permit intermixing of said elastomeric-compatible and said elastomeric-based compositions so that at least a mechanical bond will be attained between said compositions upon subsequent drying and curing; and
   wherein impregnating step (b) is completed prior to cure or vulcanization of said continuous phase elastomer.

2. The method of claim 1 wherein after step (c) said glass fiber bundles are processed to the form desired for combination with the continuous phase elastomer.

3. The method of claim 1 wherein the elastomeric-compatible and elastomeric-based compositions are applied to the fibers at the time said fibers are formed.

4. The method of claim 1 wherein said elastomeric-compatible composition is applied to said fibers as an acidic system and said elastomeric-based composition is applied as a basic system.

5. The method of claim 4 wherein the pH of said elastomeric-compatible acidic system is about 3 to 5 and the pH of said elastomeric-based basic system is about 8 to 10.

6. The method of claim 1 wherein said elastomeric-compatible composition is applied to said fibers as a basic system and said elastomeric-based composition is applied as an acidic system.

7. The method of claim 6 wherein the pH of said elastomeric-compatible basic system is about 8 to 10 and the pH of said elastomeric-based acidic system is about 3 to 5.

8. The method of claim 1 wherein said elastomeric-compatible composition is applied to said fibers in an amount equal to about 1 to 8% by weight of the coated and impregnated fibers.

9. The method of claim 1 wherein said elastomeric-based composition is applied to said fibers in an amount equal to about 3 to 12% by weight of the coated and impregnated fibers.

10. The method of claim 1 which includes the steps of combining the coated and impregnated glass fibers with the continuous phase elastomer and molding the glass fiber-elastomeric product therefrom.

11. The method of claim 1 wherein a mechanical and chemical bond is attained between the elastomeric-compatible and elastomeric-based compositions.

12. In the preparation of glass fibers for use as reinforcement for elastomeric materials which form the continuous phase of glass fiber-elastomeric products, a method of improving the integration of the glass fiber component with the elastomeric materials comprising the steps of:
   (a) providing a glass melt;
   (b) issuing a multiplicity of streams of molten glass from the melt;
   (c) rapidly attenuating the streams of molten glass into fine flexible glass fibers;
   (d) coating the glass fibers with an elastomeric-compatible composition which upon subsequent drying or curing will hold said fibers apart from one another and thereby prevent said fibers from abrading one another;
   (e) impregnating said coated glass fibers with an elastomeric-based composition which is different from said elastomeric-compatible composition in step (d) and which is capable of bonding or adhering to said continuous phase elastomer;
   (f) gathering said coated glass fibers into bundles either after step (d) and before step (e) or after steps (d) and (e); and
   (g) processing said bundles of coated glass fibers to the form desired for combination with the continuous phase elastomer; and
   wherein the improvement comprises completing impregnating step (e) while said elastomeric-compatible composition applied to said fibers in step (d) is sufficiently fluid to permit intermixing of said elastomeric-compatible and said elastomeric-based compositions so that at least a mechanical bond will be attained between said compositions upon subsequent drying and curing; and
   wherein impregnating step (e) is completed prior to cure or vulcanization of said continuous phase elastomer.

References Cited

UNITED STATES PATENTS

| | | | |
|---|---|---|---|
| 3,453,652 | 7/1969 | Marzocchi | 117—126 GB |
| 3,413,186 | 11/1968 | Marzocchi | 117—72 |
| 3,546,000 | 12/1970 | Medney | 117—115 |

WILLIAM D. MARTIN, Primary Examiner

D. COHEN, Assistant Examiner

U.S. Cl. X.R.

117—66, 72, 126